United States Patent [19]
Wilcox

[11] 3,954,118
[45] May 4, 1976

[54] FLUID PRESSURE RELIEF DEVICE

[76] Inventor: Stewart Wilcox, 7024-A Darby Ave., Reseda, Calif. 91335

[22] Filed: Oct. 7, 1974

[21] Appl. No.: 512,649

Related U.S. Application Data

[63] Continuation of Ser. No. 381,163, July 20, 1973, abandoned.

[52] U.S. Cl. .............................. 137/67; 220/89 A
[51] Int. Cl.² ........................................ F16K 13/04
[58] Field of Search .................... 137/67, 460, 461; 220/85 R, 89 A, 203, 209, DIG. 19; 138/89

[56] References Cited
UNITED STATES PATENTS

| | | | |
|---|---|---|---|
| 2,429,149 | 10/1947 | Wittenberg | 220/203 |
| 2,673,660 | 3/1954 | Nordin | 220/89 A |
| 3,496,952 | 2/1970 | Amendola | 138/89 X |
| 3,574,312 | 4/1971 | Miller | 138/89 X |
| 3,762,778 | 10/1973 | Boggs et al. | 138/89 X |

FOREIGN PATENTS OR APPLICATIONS 942,912  11/1963  United Kingdom .......... 220/DIG. 19

Primary Examiner—William R. Cline
Attorney, Agent, or Firm—Jay M. Cantor

[57] ABSTRACT

A pressure relief device in the form of a body provided with a bore and retained on a wall of a chamber with the bore opening thereinto and being outwardly flared. A deformable plug having a flared portion is frictionally secured in the bore, so that upon excessive pressure the plug moves into the bore beyond a relief port therein, with the flared portion being deformed by maintaining frictional engagement with the wall of the flared portion.

5 Claims, 8 Drawing Figures

FLUID PRESSURE RELIEF DEVICE

This is a continuation of application Ser. No. 381,163, filed July 20, 1973 now abandoned.

BACKGROUND OF THE INVENTION

From the very beginning of the art of confining fluids, and particularly gases under pressure, there has been the necessity of providing a pressure relief device which would open when the internal pressure exceeded some predetermined amount. Originally, this type of device usually consisted of a conical plug mounted on a lever arm at the outer end of which was a weight suitably adjusted to control the pressure within the chamber, i.e., the old "steam engine" safety valve. More recently, these have usually comprised a metal disc placed in a body threaded into the container, the metal being adapted to rupture to release excessive pressure. Such devices have three objections:

1. They are of excessive size when desired for use with small devices, whereby the pressure relief device was out of proportion, both as to size and as to cost of small pressure-fluid containers;
2. the devices operate only at high pressures, such as 100 pounds per square inch for a ½-inch device; 500 pounds psi for a ¼-inch device; 1,000 pounds psi for a ⅛-inch device, etc;
3. the devices are extremely costly.

The pressure relief device of the present invention can be made smaller and less expensively, and can be adapted to pressures of from 5 to 10,000 pounds per square inch. The fluid pressure relief device of the present invention does not rely upon rupture of the material but upon its deformation to permit slippage of the sealing element within the body of the device. In the preferred form, the inner bore of the body is flared outwardly at its inner end and the plug of a corresponding or a slightly greater flare to fit snugly within the flare of the bore in the body. Since the material is deformable, at a particular pressure the seal will be pushed outwardly in the bore of the body, past a pressure relief port. The pressure at which the device is to operate can be predetermined over a wide range of values. For example, in one device having a 3/16 inch bore, I was able to consistently operate the device at predetermined pressures between 440 pounds per square inch and 4,400 pounds per square inch when using solder as the plug, the variation being accomplished by the depth to which it was inserted in the bore of the body. Likewise, the pressure at which the solder plug will operate can be widely varied by varying the thickness of the plug walls. With the same body, and using "Teflon" for the plug, I was able to consistently operate the pressure relief device at pressures of 130 psi down to as low as 13 psi, again depending upon the depth of the insertion of the plug in the bore of the body. Again, the pressure at which the device operates can be easily controlled by changing the thickness of the wall, and particularly the flaring skirt, of the "Teflon" plug. By use of other materials for the plug and modifications in the shape of the plug and thickness of its walls, the pressure at which the device operates can be brought down to 5 psi, or even less, or increased to 10,000 psi, or more.

OBJECTS

It is an object of the present invention to provide an improved pressure relief device, depending upon the material used for the plug, slight modifications in its shape and the depth to which it is inserted in the body of the device.

It is another object of the present invention to provide an inexpensive pressure relief device.

It is still a further object of the present invention to provide a device that is suitable for fabrication in exceedingly small sizes, such as from 3/16 to 9/16 inch outside diameter and with a length of 7/16 to 1¼ inch, respectively.

It is another important object of the present invention to provide a device that is extremely accurate on low control pressures.

It is a further object of this invention to produce a pressure-relief device that, after actuation, can be reset, and again protect its system against over-pressuring at the same value originally set, without need of replacing any elements, and at no cost to the user.

These and further objects of the invention will be apparent from the description of the invention, taken in connection with the accompanying drawing which follows.

FIGURES

Figure 1:
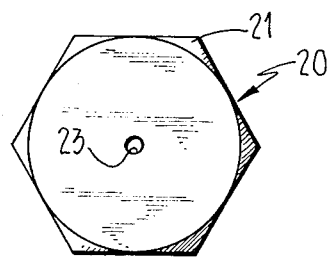
FIG. 1 is a plan view of a preferred form of pressure-relief device.
Figure 2:
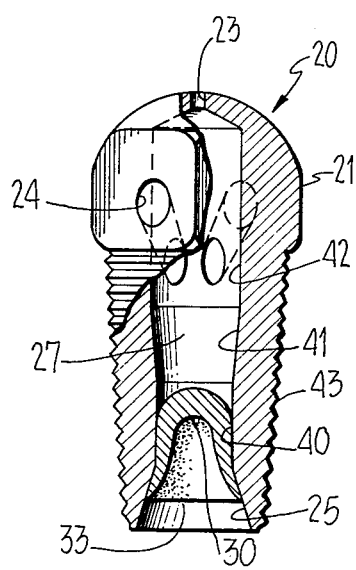
FIG. 2 is a side view, mostly in cross-section, of the device shown in FIG. 1.

It will be understood that pressure relief devices of the kind herein described are adapted to be inserted into an aperture in a wall of a container in which the fluid is confined, or into a pipe conducting such a fluid under pressure. Accordingly, it is believed unnecessary to show the container with the devices to be inserted, but to show and describe only the device itself. FIGS. 1 and 2 illustrate a pressure relief device of the present invention. The body 20 of the device in this form is about an inch in length and about 7/16 inch in diameter. It is made of a suitable metal and comprises two sections — a hexagonal section 21 and a threaded inner section 22. This particular construction is utilized in order to provide for easy insertion into a threaded aperture with which the container is provided. As shown in FIG. 2, the body 20 comprises a hollow plug having an inner bore 27, a vent 23 in the top, a number of relief ports 24 leading from the interior hollow section at an intermediate point, an outwardly and flared inner end 25. Adapted to fit in the inner flared end is a hollow plug 30 with a shape similar to that shown in FIG. 3.

The plug 30 has its inner end flared outwardly to conform to the shape of the flared end 25 of the hollow bore. When the pressure in the vessel exceeds that for which the plug is designed, the plug, because of its easy deformation (due to the material with which it is constructed in the thinness of its walls), will be pushed inwardly in the inner bore 27 until it passes the inner end of the relief ports 24, thereupon the fluid in the container may escape to atmosphere. Obviously, the height of the plug must be less than the distance from the inner ends of the relief ports 24 to the top of the bore, so that when the desired pressure is exceeded, the plug will be pushed past the inner ends of these ports.

It will be noted that the inner bore 27 is larger in its intermediate section. As is particularly shown in FIG. 3, the flare section 25 passes into a cylindrical section 40 which shortly becomes larger in a conical section 41 and enlarged cylindrical section 42 which terminates above the inner ends of the ports 24. I have found that an angle of approximately 1° in the enlarging conical section 41 is sufficient to enable the plug 37 to move rapidly to the extreme end of the bore once the pressure inside pushes the plug by the minimum diameter of the bore at the outer end of the flaring section 25. Once the plug 26 has passed the end of the flare 25, it will slide more readily in the bore 27.

Figure 3:
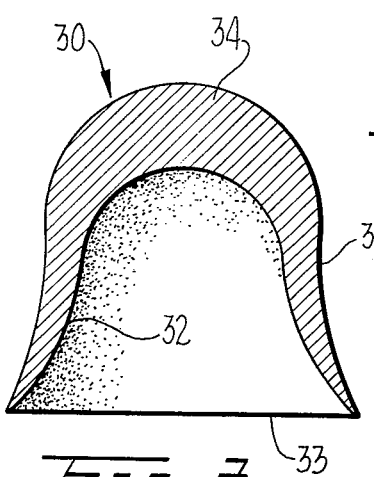
FIG. 3 is an enlarged cross-sectional side view of a preferred form of plug used in the device of FIG. 2.

The plug 30, as is particularly shown in FIG. 3, has a hemispherically shaped upper end, the upper, or outer, end hemispherical wall 34 curves gently into a short, generally cylindrical center section 31 and, that, in turn, flows smoothly into a long, outwardly flaring curved section 32. As is well shown in this figure, the hemispherical top 34 is considerably thicker than the generally cylindrical walls 31, and these are gradually reduced in thickness as they merge into the outwardly flared inner end 31 to eventually come to a knife edge at the bottom 33. As the pressure increases toward the critical point, it will force the plug 26 upwardly along the flaring end 25 of the bore 27, the outwardly flared end 32 of the plug 30 being sufficiently resilient to deform sufficiently to pass into the central section 41, 42 of the center bore 27 of the plug 30. Thus, the plug 30 is held in the lower end of the bore 27 by friction which, due to the shape of the bore 27 and plug 30, has a high initial inertia, but once starting to move, would move rapidly in the bore 27. It can be noted at this point that anything that will increase the friction between the plug and the bore, will increase the operating pressure required to operate the device. For example, placing a series of shoulders, or serrations, or even wavy undulations, on the end of the skirt or flared section 32 of the plug will increase the force required to move the plug into and through the bore 27.

Figure 4:
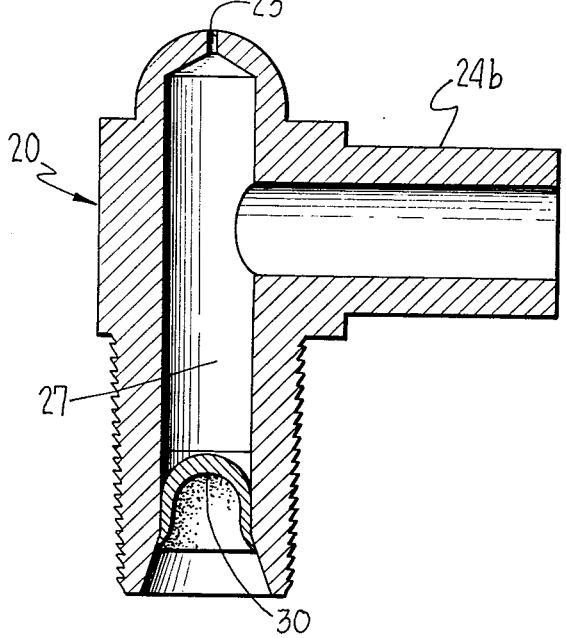
FIG. 4 is another device similar to that shown in FIG. 2 but differing therefrom in having provision for remote venting of the fluid whose pressure is to be controlled by the pressure-relief device.

The device shown in FIG. 4 has a body portion 20 similar to that of FIG. 2, except that instead of a plurality of relief ports 24, it is provided with a single outlet, or relief port, 24b, cylindrical in shape, and adapted to receive a flexible tube or pipe fitting to conduct the fluid within the container to some remote location. The bore 27 in this embodiment is perfectly cylindrical, as in many, if not most, instances this is very satisfactory. I have found that in most instances the movement of the plug 30 past the flared section 25 of the bore 27 has so deformed the plug that it thereafter moves quite freely in a cylindrical bore 27.

Figure 5:
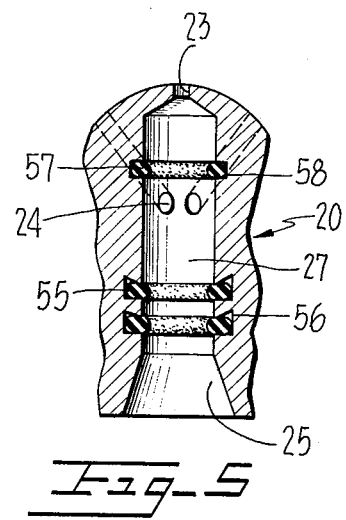
FIG. 5 is a further device similar to FIG. 2 but having 0 rings utilized for controlling the friction between plug and the bore wall, which are valuable in devices designed for moderate pressures, and are also suitable for resetting the device by returning the plug to its original position without removing the device from containers.

FIG. 5 shows a further modification of the invention. This form provides a little more friction to the movement of the plug within the bore by means of one or two 0 rings 55 set into grooves 56 cut in the walls of the central section of the bore 27. Hence, the groove will be cut in depth to cause the 0 ring to protrude into the bore. The 0 ring will provide additional friction with the plug 30 to require an initial high force to move the plug into the intermediate section of the bore 27, once past the initial resistance, it will move freely in the central section of the bore. By using the 0 ring, the enlarged intermediate section 42 and flaring section 41 of the embodiment shown in FIG. 3 can be eliminated.

A usual characteristic of the various compounds used in 0 rings is that of adhering to or "seizing" on metal after long, motionless emplacement, I prefer to make the plug of, or cover it with, "Teflon" to assure consistent pressure over extended periods of time. An additional 0 ring 57 which may be of smaller size, and of less frictional interference, is placed in a corresponding groove 58, in the upper portion of bore 27, to retain the plug during the venting of over-pressure fluid.

An additional feature of this design is that, after venting over-pressure, the plug can be returned to its original position in the 0 rings 55, and will again protect the system against over-pressure. This may be accomplished by return pin 82, FIG. 9.

In any event, operative settings can be altered by altering the depth of the 0 ring retaining grooves, by the size and hardness of the 0 rings employed, and by the number of 0 rings used in the sealing position.

Figure 6:
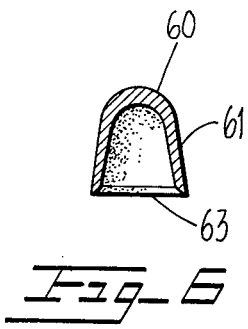
FIGS. 6 and 7 are side views of various plugs, which show some of the modifications of the deformable plugs suitable for particular installations.
Figure 7:
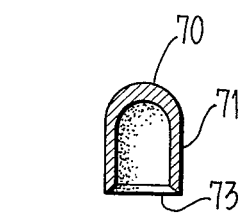
Figure 8:
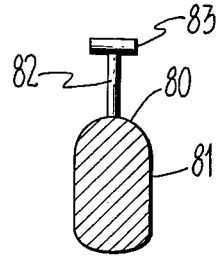
FIG. 8 is a side view of a plug suitable for use in the 0 ring device of FIG. 5.

Various shapes of plugs may be used and these are illustrated in FIGS. 6 to 8, inclusive. The form shown in FIG. 3 has already been described and comprises the hemispherical end or top 34, the generally cylindrical center section 31, and flared outer ends 32 which are adapted to fit snugly into the flaring walls 25 at the inner end of the central bore 27. A similar form is shown in FIG. 6 which has a hemispherical top section 60 which moves gently into a truncated conical section 61 with gradual reducing wall thickness terminating in a blunt edge 63. Preferably, the flare of the conical section 61 will conform to the conical flare of the flaring section 25 of the inner bore 27. This form of plug will move more readily than that shown in FIG. 3 so that even though made with the same material and with the same thickness of walls as the form shown in FIG. 3, it will move under slightly reduced pressure.

Another form of plug is shown in FIG. 7 and comprises another hemispherical end 70 which merges into a cylindrical wall 71 that extends throughout the length of the plug and terminates in a rather blunt edge 73 as shown. Other things being equal, it will move more readily than the plug of FIG. 6.

FIG. 8 shows another form of plug which is solid material having an inner hemispherical end 80 and a solid cylindrical body 81. This form of plug is particularly adapted to be used in the form of body shown in FIG. 5 which utilizes the 0 rings 55. This form requires little force to move it into the intersection and to pass by the ports 24. It has already been mentioned that this plug may readily be reset by use of resetting pin 82 extending through the vent 23 which is enlarged to receive the pin 82. In this form, the pin 82 is threaded into mating threads in the plug so that the flat top 83 of the pin 82 becomes a stop to properly place the plug 80 when the device is reset.

It will be understood that in all of these forms the vent 23 is necessary so that there will be no increase in air pressure in the outer end of the body section as the plug is pushed outwardly in the inner bore 27 by the force of the pressure being confined within the container. It will be understood that as the walls of the plug start to pass the relief ports 24, they begin to open them and finally completely open them, and if the vent 23 were not provided, the air in the upper or outer end of the relief port would be compressed to work against the interior pressure trying to operate the relief valves.

It is believed obvious that as the elasticity, or deformability, of the material used for the plug is changed, the force required to operate the pressure relief device will also change. It has been indicated that in one form, the use of a deformable metal, such as solder, required a force of 4,400 pounds to operate the relief valve, while the same body using "Teflon" as a plug would operate at a pressure of 130 pounds per square inch, or one-thirty-fourth of that of the solder plug, thus, a wise choice of materials to be used in the plug will enable one to cover an exceedingly wide range of pressures which can be effectively controlled by the relief device of the present invention.

It can be noted that the area of a plug effected by the pressure tending to unseat it, is that of the square of the radius of the bore, and the retaining force, or counteracting force, is that of the area of bore-and-plug in contact (i.e., the circumference of the plug multiplied by the length of contact with the bore wall) multiplied by the plug's coefficient of friction; the resistance to deformation of the plug is affected by the thickness of the plug wall in the contact area — are all variables in controlling the force required to move the plug from a sealing to an unsealing position.

It is obvious that the force required to operate the device of the present invention can be varied over wide ranges by the judicious use of the material of which the plug is to be made, and the thickness of the walls of the hollow plugs and the flare (or lack of it) of the inwardly extending walls. However, all of the devices shown have the common feature that the plug is deformable and is held in its initial position entirely by friction. It might even be said that the present invention utilizes a friction-type seal instead of the usual rupture disc, and by so doing, one is enabled to use smaller and less complicated equipment than has heretofore been done. Various devices may be used to increase or decrease the frictional resistance, such as the finish between the mating surfaces of the bore and the plug, or seal, the size of the radius which translates the entry angle of the flared section into the cylindrical bore, as well as the angle of the sealing plug protruding into the flared section. Additionally, the actual position of the seal in the body affects the pressure of the given seal. As the seal is installed higher and higher in the body, less and less of the retaining skirt is in contact with the restraining flare 25, whereby the sealing plug will release at lower and lower pressures. For example, where the plug was inserted within the flare, as shown in FIG. 2, use of a solder plug required a blowout of pressure of 4,400 pounds per square inch. However, when the same part was installed to a maximum depth, that is, with the lower edge of the flare (adjacent the knife edge 33) adjacent the top of the flare 25 in the bore 27, the blowout pressure was 10% of that figure, or 440 pounds per square inch. Similar tests with a Teflon plug required a blowout pressure of 130 pounds per square inch in the lower position and 13 pounds per square inch in the high position. Thus, blowout pressure can be controlled on the ratio of 1:10 by merely changing the location of the plug in the lower portion of the bore.

This, coupled with the thinness or thickness of the skirt of the plug, gives a wide variety of pressures at which the plug will move.

With all of these variables, it is possible to cover a wide range of pressure settings with the same body and the same seal simply by changing the installation position of the seal and/or the thickness of the skirt of the plug. This, coupled with the variability that is inherent in the use of different materials, gives a wide range of pressures at which the present device will operate.

It is also obvious that placing a series of external serrations or undulations on the skirt of the sealing plug, will increase the friction with which the plug is embraced by the bore and hence vary the pressure required to operate the device.

It should also be noted that while I have shown the flared plugs 30 and 60 as being hollow, this is not necessarily the shape they have to be. The flared plugs 30 and 60 can be solid. Such a change will increase the force necessary to deform the plug so it can pass out of the flared section 25 into the central bore — but it is a possible construction.

Many modifications of the form of the plug and the shape of angle of flare in the flare portion of the body will give control of operating pressure over a wide range. Many other modifications of the basic idea can be suggested. For example, the angle of flare of the interior conical section 41, for instance, might even be a definite shoulder going from the top of the flared section to the interior of the bore with a substantially increased diameter in the latter. Likewise, the length of the skirt, the angle of its flare, the thickness of the material with which it is made, and the type of material of which it is made, all control the amount of the bursting force.

These and other modifications can be made in the present device by those skilled in the art, and all such modifications are intended to lie within the scope of the following claims.

I claim:
1. A pressure relief device comprising:
   1. a body having an interior bore;
   2. means for retaining an inner end of said body in the wall of a container with which the device is to be associated;
   3. pressure relief ports leading from an intermediate section of said bore to a position outside of the retaining means;
   4. an outwardly flared section on the inner end of said bore; and
   5. an elongated friction plug of deformable material adapted to fit in the flared section of said bore, and formed with a hemispherical outer end for extending into the bore and a depending skirt of reduced thickness extending therefrom in frictional contact with the outwardly flared section the flared end of the plug being deformable by its movement outwardly into the bore while in friction engagement with the flared wall of the bore.

2. A pressure relief device comprising:
a body having an interior bore;
means for retaining an inner end of said body in the wall of a container with which the device is to be associated;
pressure relief ports leading from an intermediate section of said bore to a position outside of the retaining means;

an outwardly flared section on the inner end of said bore; and a deformable plug adapted to fit in the flared section of said bore;

the plug being formed with a hemispherical outer end penetrating into the bore and a depending skirt of reduced thickness extending inwardly therefrom; wherein the skirt section is of gradually decreasing thickness as it proceeds from said outer end toward the inner end of the plug the flared end of the plug being deformable by its movement outwardly into the bore while in frictional engagement with the flared wall of the bore.

3. A pressure relief device comprising:

a body having an interior bore;

means for retaining an inner end of said body in the wall of a container with which the device is to be associated;

pressure relief ports leading from an intermediate section of said bore to a position outside of the retaining means;

an outwardly flared section on the inner end of said bore; and a deformable elongated plug adapted to frictionally fit in the flared section of said bore; wherein the diameter of the bore between the outer end of the flaring section and the outer end of the body is of a greater diameter than the minimum size of the flared section the flared end of the plug being deformable by its movement outwardly into the bore while in frictional engagement with the flared wall of the bore.

4. A pressure relief device comprising:

a body having an interior bore;

means for retaining an inner end of said body in the wall of a container with which the device is to be associated;

pressure relief ports leading from an intermediate section of said bore to a position outside of the retaining means;

an outwardly flared section on the inner end of said bore; and a deformable elongated plug adapted to frictionally fit in the flared section of said bore; wherein the wall of the bore of the body is provided with annular grooves and "0" rings seated therein with their inner peripheries within the bore the flared end of the plug being deformable by its movement outwardly into the bore while in frictional engagement with the flared wall of the bore.

5. A pressure relief device comprising:

a body having an interior bore;

means for retaining an inner end of said body in the wall of a container with which the device is to be associated;

pressure relief ports leading from an intermediate section of said bore to a position outside of the retaining means;

an outwardly flared section on the inner end of said bore; and a deformable elongated plug adapted to frictionally fit in the flared section of said bore; wherein the plug includes a skirt in the form of a straight sided truncated cone the flared end of the plug being deformable by its movement outwardly into the bore while in frictional engagement with the flared wall of the bore.

* * * * *